(12) United States Patent
Lankes et al.

(10) Patent No.: US 10,294,537 B2
(45) Date of Patent: May 21, 2019

(54) METHOD FOR PRODUCING A RETORT FOR A NITRIDING FURNACE AND RETORT

(71) Applicant: IVA Schmetz GmbH, Menden (DE)

(72) Inventors: Heinrich-Peter Lankes, Schwalmtal (DE); Peter Haase, Isselburg (DE); Dirk Miller, Bocholt (DE)

(73) Assignee: IVA SCHMETZ GMBH, Menden (DE)

( * ) Notice: Subject to any disclaimer, the term of this patent is extended or adjusted under 35 U.S.C. 154(b) by 167 days.

(21) Appl. No.: 15/503,464

(22) PCT Filed: Aug. 14, 2015

(86) PCT No.: PCT/EP2015/068805
§ 371 (c)(1),
(2) Date: Feb. 13, 2017

(87) PCT Pub. No.: WO2016/026795
PCT Pub. Date: Feb. 25, 2016

(65) Prior Publication Data
US 2017/0226604 A1    Aug. 10, 2017

(30) Foreign Application Priority Data
Aug. 18, 2014 (DE) .................... 10 2014 111 779

(51) Int. Cl.
*C21D 9/00* (2006.01)
*F27B 3/24* (2006.01)
(Continued)

(52) U.S. Cl.
CPC .......... *C21D 9/0043* (2013.01); *B23K 31/027* (2013.01); *C23C 8/24* (2013.01);
(Continued)

(58) Field of Classification Search
CPC .................................................. C21D 9/0043
See application file for complete search history.

(56) References Cited

U.S. PATENT DOCUMENTS 2,474,526 A * 6/1949 Healy, Jr. ............. C23G 1/08
510/108
3,043,758 A * 7/1962 Machu .................. C23G 1/08
134/27
(Continued)

FOREIGN PATENT DOCUMENTS

| CN | 103451646 A | 12/2013 |
|---|---|---|
| DE | 51181 A1 | 10/1965 |

(Continued)

OTHER PUBLICATIONS

D.E. Wenschhof "Controlling Corrosion of Furnace Muffles"; Industrial Heating, National Industrial Publishing Co., Pittsburgh, US—ISSN 0019-8374; vol. 42, No. 8, pp. 10-17, Aug. 1975.

(Continued)

*Primary Examiner* — Scott R Kastler
(74) *Attorney, Agent, or Firm* — J-Tek Law PLLC; Jeffrey D. Tekanic; Scott T. Wakeman

(57) ABSTRACT

A method for producing a retort for a nitriding furnace, in which metallic workpieces are heat-treated in a pre-determined atmosphere, includes pickling at least the surfaces of the retort, which are configured to come into contact with the pre-determined atmosphere while the nitriding furnace is operating, by using a pickling agent. The pickled surfaces may then be electropolished and passivated. A retort may be produced according to this method and the retort may be used in a nitriding furnace.

15 Claims, 1 Drawing Sheet

(51) Int. Cl.

| | | |
|---|---|---|
| *C23C 8/24* | (2006.01) | |
| *C23C 8/30* | (2006.01) | |
| *C23G 1/08* | (2006.01) | |
| *F27D 1/00* | (2006.01) | |
| *C25F 3/24* | (2006.01) | |
| *B23K 31/02* | (2006.01) | |
| *C23C 8/26* | (2006.01) | |
| *C23C 22/50* | (2006.01) | |
| *F27B 5/04* | (2006.01) | |

(52) U.S. Cl.
CPC .................. *C23C 8/26* (2013.01); *C23C 8/30* (2013.01); *C23C 22/50* (2013.01); *C23G 1/085* (2013.01); *C23G 1/086* (2013.01); *C25F 3/24* (2013.01); *F27B 5/04* (2013.01); *F27D 1/0006* (2013.01)

(56) References Cited

U.S. PATENT DOCUMENTS

| | | | |
|---|---|---|---|
| 3,764,304 A | 10/1973 | Nehrenberg et al. | |
| 4,415,415 A * | 11/1983 | Zaremski | C25F 1/06 148/287 |
| 5,948,181 A * | 9/1999 | Kohno | B21B 45/08 148/325 |
| 6,228,445 B1 | 5/2001 | Tverberg | |
| 6,399,031 B1 | 6/2002 | Herrmann et al. | |
| 2007/0215249 A1* | 9/2007 | Lunner | C21C 7/0685 148/24 |
| 2007/0251947 A1 | 11/2007 | Plengorth | |
| 2009/0053130 A1 | 2/2009 | Redlingshoefer et al. | |
| 2009/0309277 A1 | 12/2009 | Jones | |

FOREIGN PATENT DOCUMENTS

| | | |
|---|---|---|
| DE | 1295965 A | 5/1969 |
| DE | 2327965 A1 | 12/1974 |
| DE | 160097 A1 | 5/1983 |
| DE | 29615312 U1 | 10/1996 |
| DE | 19634450 A1 | 3/1998 |
| DE | 60006439 T2 | 8/2004 |
| GB | 1069803 A | 5/1967 |
| JP | S56108088 A | 8/1981 |
| JP | S5714793 U | 1/1982 |
| JP | S57193284 A | 11/1982 |
| JP | S6436800 A | 2/1989 |
| JP | H01165800 A | 6/1989 |
| JP | H01503790 A | 12/1989 |
| JP | H0610171 A | 1/1994 |
| JP | H0610172 A | 1/1994 |
| JP | H0617271 A | 1/1994 |
| JP | H06306653 A | 11/1994 |
| JP | H09166290 A | 6/1997 |
| JP | H11152590 A | 6/1999 |
| JP | 2006233261 A | 9/2006 |
| JP | 2010070844 A | 4/2010 |
| WO | 2005111269 A1 | 11/2005 |
| WO | 2007124996 A1 | 11/2007 |
| WO | 2011111391 A1 | 9/2011 |

OTHER PUBLICATIONS

English translation of the International Search Report for parent application No. PCT/EP2015/068805.
English translation of the Written Opinion of the International Searching Authority for parent application No. PCT/EP2015/068805.
Search report of the German Patent & Trademark Office for parent application No. 10 2014 111 779.4, and English translation thereof.
Office Action from the Chinese Patent Office dated Jul. 3, 2018 in related Chinese application No. 201580044193.3, and machine translation thereof.
Machine translation of Search Report from the Japanese Patent Office dated Jan. 17, 2019 in counterpart Japanese application No. 2017-507877.
Office Action from the Japanese Patent Office dated Feb. 5, 2019 in counterpart Japanese application No. 2017-507877, and translation thereof.

* cited by examiner

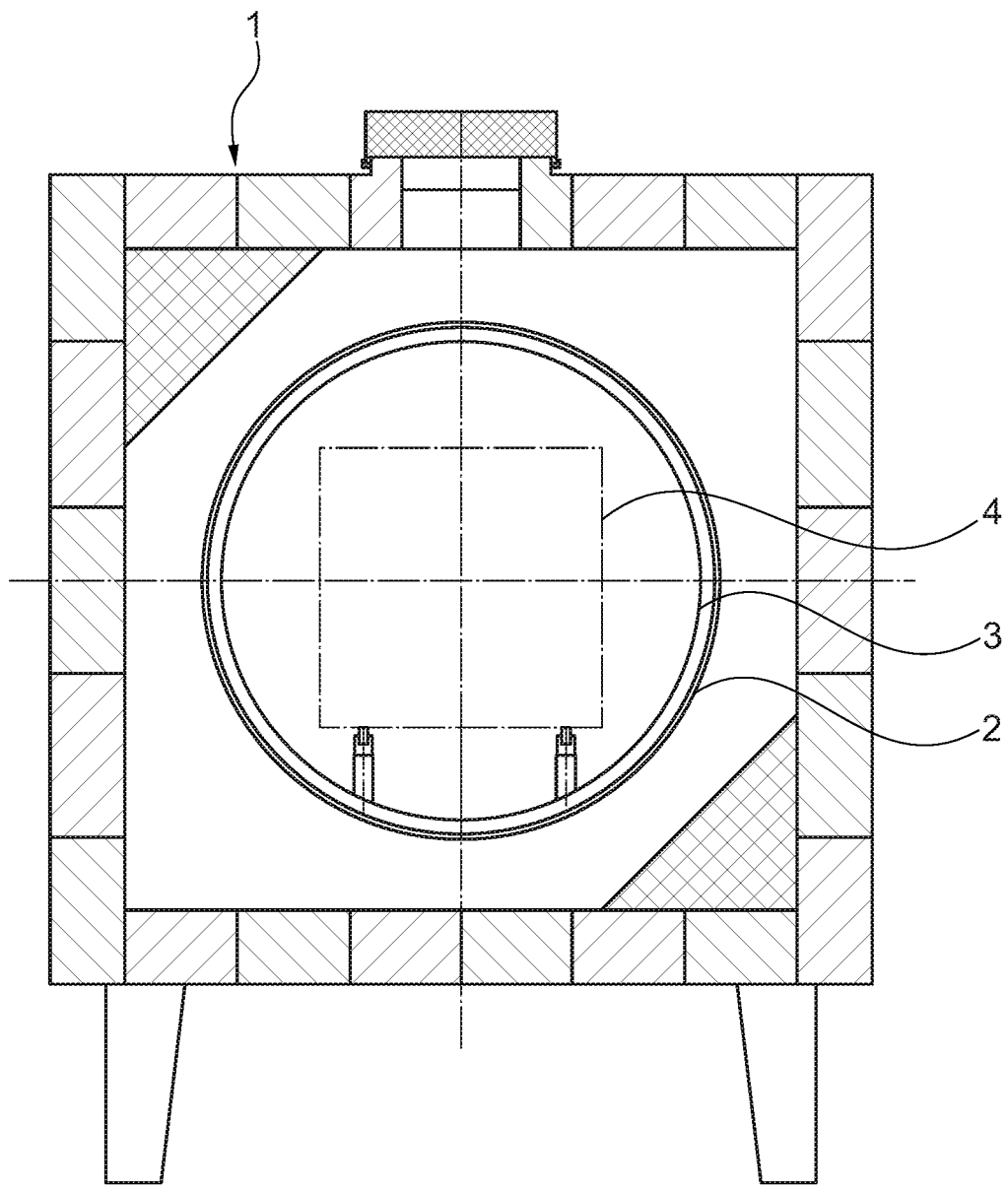

METHOD FOR PRODUCING A RETORT FOR A NITRIDING FURNACE AND RETORT

CROSS-REFERENCE

This application is the U.S. National Stage of International Application No. PCT/EP2015/068805 filed on Aug. 14, 2015, which claims priority to German patent application No. 10 2014 111 779.4 filed on Aug. 18, 2014.

TECHNICAL FIELD

The invention relates to a method for producing a retort for a nitriding furnace, in which metallic workpieces are heat-treated in a pre-determined atmosphere, wherein the retort is produced from a stainless steel. The invention also relates to a retort for a nitriding furnace. Finally, the invention relates to a nitriding furnace.

RELATED ART

Metallic workpieces can be heat-treated in a multitude of ways in a pre-determined atmosphere. A generally known method is the nitriding of workpieces made of steel. This is a method for the surface hardening of steel, whereby nitrogen from a nitrogen-containing atmosphere is enriched in the surface of the steel components. Nitriding is a method for case hardening of steels. Nitrocarburizing is a combination of nitriding and carburizing.

Nitriding and nitrocarburizing processes are carried out in evacuable retorts of nitriding furnaces. The retorts are made of non-rusting or stainless steel. For nitriding and nitrocarburizing processes between 500° C. and 580° C., gaseous media, mainly nitrogen ($N_2$), carbon dioxide ($CO_2$), hydrogen or $H_2$, endogas, hydrocarbons ($C_xH_y$) and ammonia ($NH_3$), are used. Ammonia must be present in the process as a nitrogen donor.

For the introduction of nitrogen into the surface of steel components or workpieces made of steel, the nitrogen must be present in atomic form. Due to the high stability of the bond, nitrogen as a molecule is no longer usable for the process.

The generation of atomic nitrogen takes place under the given temperature and pressure conditions in the process owing to the addition of gaseous ammonia.

The ammonia reacts in accordance with the following reaction:

$$NH_3 \rightarrow [N] + 3/2 H_2$$

or $$2NH_3 \rightarrow N_2 + 3H_2$$

wherein atomic nitrogen, i.e. [N], is available for diffusion transfer into the steel component only in the first case. During this, the ammonia, in part, splits on the surface of the steel components or workpieces, the resulting atomic nitrogen is deposited in the workpiece and forms a hardened case. The hydrogen liberated during the nitriding leaves the furnace together with the uncracked ammonia and is usually disposed of. If the inevitable recombination into $N_2$ has already fully taken place, the nitriding process is over.

The ammonia supplied should preferably dissociate directly on the steel component in order to provide a sufficient quantity of atomic nitrogen there, i.e. a high nitriding potential. A quantification of this nitriding potential is made possible by the so-called nitriding number, $K_N$. This is defined as $$K_N = \frac{p_{NH_3}}{p_{H_2}^{1.5}}$$

where p is the partial pressure. In addition to the temperature and pressure conditions, the dissociation reaction is also influenced catalytically. This catalytically influenced dissociation of the ammonia is undesired, but it occurs in principle on all metallic and active surfaces within the reaction space. In retort furnace plants these are primarily the inner surfaces of the retort, but also the surface of carrying devices for the workpieces. Stainless steel 1.4841 (X15CrNiSi25-21) or stainless steel 1.4828 are usually used for the retorts. Owing to the high nickel content of the components of this stainless steel, there is a distinct tendency for premature splitting of the ammonia. For this reason a relatively large quantity of ammonia has to be fed in to set a specific nitriding potential. Moreover, due to the nitriding process, this material inevitably also has its nitrogen content increased, which brings with it an undesired increase of the surface roughness and disadvantages with regard to service life.

SUMMARY

Therefore, it is one object of the invention to disclose a method for producing a retort to avoid the aforementioned disadvantages, in particular the increase in nitrogen content during the nitriding process. Other objects of the invention are to provide an improved retort, which has in particular a high resistance to being nitrided during the nitriding process, and to provide a nitriding furnace with an improved retort.

In one aspect of the present disclosure, at least the surfaces of the retort that come into contact with the pre-determined atmosphere while the nitriding furnace is operating are pickled by using a pickling agent. In particular the inner surface or inner wall of the retort comes into contact with the pre-determined atmosphere. The pre-determined atmosphere is in particular an atmosphere containing nitrogen.

The invention is based on the recognition that the undesired reactions can be minimised if the metallic surfaces that come into contact with the pre-determined atmosphere in the operating state of the nitriding furnace, especially the surfaces on the inside of the retort, have a passivity that is as high as possible. The surfaces of the retort treated by using a pickling agent then exhibit only a low catalytic activity. The buildup of a high nitriding potential during the nitriding in the retort is thereby possible with a low ammonia quantity. The pickling agent preferably comprises nitric acid and hydrofluoric acid, in particular a mixture of nitric acid and hydrofluoric acid.

Preferably, the surfaces are polished after the pickling by using an electrolyte in a galvanic bath. This leads to a reduction of the surface roughness, i.e. in total to a smaller overall surface. As a result, the adsorption of ammonia on the surface as a pre-stage to the dissociation is reduced. Also advantageous is the higher resistance to corrosion. The overall service life of the retort thereby extends. The surfaces that are electropolished are in particular the inner surfaces of the retort. According to the invention the electrolyte comprises phosphoric acid and sulfuric acid. Preferably the electropolishing takes place in a galvanic bath composed of phosphoric acid and sulfuric acid. Preferably the polished surfaces are passivated with nitric acid.

Within the framework of the invention, the retort, which is cylindrical shaped, is made from metal sheet cut-outs which are welded together. Preferably, the retort concentrically encompasses a guide cylinder for accommodating the workpieces during the heat treatment.

Furthermore, the invention provides a retort for a preferably evacuable nitriding furnace, in which metallic workpieces are heat-treated in a predetermined (nitrogen-containing) atmosphere, the retort being made of a non-rusting steel or a stainless steel, characterised in that at least the surfaces of the retort that come into contact with the pre-determined atmosphere in the operating state of the nitriding furnace have been pickled by using a pickling agent.

The heat treatment of the workpieces takes place in the retort. The surfaces that are pickled are in particular the inner surfaces of the retort.

In a preferred embodiment of the invention the retort is made from metal sheet cut-outs which are welded together. Preferably the retort is cylindrical shaped. Preferably, the retort concentrically encompasses a guide cylinder for accommodating the workpieces during the heat treatment.

Preferably, the pickled surfaces of the retort are electropolished. These are in particular the inner surface of the retort and the surfaces of the guide cylinder, which come into contact with the atmosphere during the heat treatment.

Preferably the polished surfaces of the retort have been passivated with nitric acid.

Finally, according to another aspect of the present disclosure, a nitriding furnace, in which metallic workpieces are heat-treated in a pre-determined atmosphere, comprises a retort according to any of the embodiments disclosed above or below. Nitriding furnaces for performing nitriding and nitrocarburizing processes usually include evacuable retorts in which the aforementioned processes take place.

BRIEF DESCRIPTION OF THE DRAWINGS

In the following, the invention will be described in more detail with respect to a preferred embodiment illustrated in the sole Figure, which shows a retort for an evacuable nitriding furnace that comprises a guide cylinder.

DETAILED DESCRIPTION OF THE INVENTION

A retort 2 is made for an evacuable nitriding furnace 1. First, metal sheet cut-outs are made from rolled stainless steel sheet, an essentially cylindrically shaped retort 2 is formed and the metal sheet cut-outs are then welded together. The retort 2 comprises a known guide cylinder 3 made from stainless steel. The guide cylinder 3 serves to accommodate or store (hold) the workpieces 4 during the nitriding process.

The inner surfaces of the retort and the guide cylinder are pickled. For this, a mixture of nitric acid and hydrofluoric acid is used. The surfaces treated by using the pickling agent then exhibit only a low catalytic activity. The build-up of a high nitriding potential during the nitriding in the retort is thereby possible with a low ammonia quantity.

After the pickling, the pickled surfaces are electropolished in a galvanic bath composed of phosphoric acid and sulfuric acid. Thereafter, the pickled surfaces are passivated with nitric acid. The electropolishing leads to a reduction of the surface roughness, i.e., in total to a smaller overall surface. In this way the adsorption of ammonia on the surface as a pre-stage to the dissociation is reduced. Also advantageous is the higher resistance to corrosion. The service life of the retort thereby significantly extends.

The invention claimed is:

1. A method for producing a retort for a nitriding furnace, in which metallic workpieces are heat-treated in a pre-determined atmosphere, wherein the retort is produced from a stainless steel, comprising:
    pickling at least the surfaces of the retort, which are configured to come into contact with the pre-determined atmosphere while the nitriding furnace is operating, by using a pickling agent; and
    after pickling, polishing the surfaces by using an electrolyte in a galvanic bath.

2. The method according to claim 1, wherein the pickling agent comprises nitric acid and hydrofluoric acid.

3. The method according to claim 1, wherein the electrolyte comprises phosphoric acid and sulfuric acid.

4. The method according to claim 1, further comprising passivating the polished surfaces with nitric acid.

5. The method according to claim 1, wherein the retort is cylindrical shaped, and the retort is made from metal sheet cut-outs, which are welded together.

6. The method according to claim 1, wherein the retort is made from metal sheet cut-outs, which are welded together.

7. The method according to claim 1, wherein the retort is cylindrical shaped.

8. The method according to claim 1, wherein the retort concentrically encompasses a guide cylinder configured to hold the metallic workpieces during operation.

9. The retort method according to claim 8, wherein:
    the retort is made from metal sheet cut-outs, which are welded together; and
    the retort is cylindrical shaped.

10. The method according to claim 4, wherein the pickling agent comprises nitric acid and hydrofluoric acid.

11. The method according to claim 10, wherein the electrolyte comprises phosphoric acid and sulfuric acid.

12. The method according to claim 11, wherein the retort is cylindrical shaped and the retort is made from metal sheet cut-outs, which are welded together.

13. The method according to claim 12, wherein inner surfaces of the retort are pickled, electropolished and passivated.

14. The method according to claim 12, wherein the pre-determined atmosphere contains ammonia.

15. The method according to claim 1, wherein the pre-determined atmosphere contains ammonia.

* * * * *